(12) United States Patent
Danielson

(10) Patent No.: US 12,728,943 B2
(45) Date of Patent: Sep. 8, 2026

(54) SPLASH GUARD ARRANGEMENT FOR A BICYCLE

(71) Applicant: PARAPLY AB, Gothenburg (SE)

(72) Inventor: Petter Danielson, Västra Frölunda (SE)

(73) Assignee: PARAPLY AB, Gothenburg (SE)

( * ) Notice: Subject to any disclaimer, the term of this patent is extended or adjusted under 35 U.S.C. 154(b) by 260 days.

(21) Appl. No.: 18/716,038

(22) PCT Filed: Nov. 2, 2022

(86) PCT No.: PCT/EP2022/080531
§ 371 (c)(1),
(2) Date: Jun. 3, 2024

(87) PCT Pub. No.: WO2023/104396
PCT Pub. Date: Jun. 15, 2023

(65) Prior Publication Data

US 2025/0033725 A1 Jan. 30, 2025

(30) Foreign Application Priority Data

Dec. 7, 2021 (SE) .................................... 2151487-2

(51) Int. Cl.
*B62J 15/02* (2006.01)

(52) U.S. Cl.
CPC .................................... *B62J 15/02* (2013.01)

(58) Field of Classification Search
CPC ................................. B62J 15/02; B62J 15/00
See application file for complete search history.

(56) References Cited

U.S. PATENT DOCUMENTS 634,520 A 10/1899 Chapman
2,091,910 A * 8/1937 Cohen ...................... B62J 15/04
280/852

(Continued)

FOREIGN PATENT DOCUMENTS

CN 104816773 A 8/2015
CZ 1215 U1 1/1994

(Continued)

OTHER PUBLICATIONS

International Search Report from corresponding International Application No. PCT/EP2022/080531, mailed on Feb. 6, 2023, 3 pages.

(Continued)

*Primary Examiner* — James M Dolak
(74) *Attorney, Agent, or Firm* — Tucker Ellis LLP

(57) ABSTRACT

The present invention relates to a splash guard arrangement (1) for a bicycle (3). The splash guard arrangement comprises a splash guard (5), a holder (7), a first fastener (9), and a second fastener (11). The holder comprises a first (21), a second (23) and a third (25) portion. The second portion is arc-shaped and is located between the first portion and the third portion. The first portion comprises a first holder end portion (27) and the third portion comprises a second holder end portion (29). The first fastener is adapted for attachment of the holder to a first frame component of the bicycle. The first fastener is adapted to be attached to the first holder end portion. The second fastener is adapted for attachment of the holder to a second frame component of the bicycle. The second fastener is adapted to be attached to the second holder end portion. The splash guard is transitable from a first shape to a second shape. The splash guard is configured to be held in the second shape by attachment to the second portion of the holder. The present invention also relates to a (Continued)

method of attaching the splash guard arrangement to a bicycle.

17 Claims, 10 Drawing Sheets

(56) References Cited

U.S. PATENT DOCUMENTS

| | | | | | |
|---|---|---|---|---|---|
| 5,112,071 | A * | 5/1992 | Jones | B62J 15/02 | D12/186 |
| 5,120,073 | A * | 6/1992 | Sealy, Jr. | B62J 15/02 | 280/852 |
| 5,151,935 | A * | 9/1992 | Slife | H04M 3/005 | 379/240 |
| 5,562,296 | A * | 10/1996 | Hall | B62J 15/00 | 280/852 |
| 5,700,022 | A * | 12/1997 | Finnson | B62J 15/00 | 280/852 |
| 5,868,411 | A * | 2/1999 | Dymeck | B62J 15/00 | 280/852 |
| 5,954,354 | A * | 9/1999 | Chung | B62J 15/02 | 280/852 |
| 6,199,883 | B1 * | 3/2001 | Gable | B62J 15/00 | 280/852 |
| 6,367,832 | B1 * | 4/2002 | Vogel | B62J 15/00 | 280/852 |
| 6,435,533 | B1 * | 8/2002 | Chuang | B62J 15/00 | 403/370 |
| 6,446,994 | B1 * | 9/2002 | Smerdon, Jr. | B62J 15/00 | 280/852 |
| 6,659,483 | B2 * | 12/2003 | Blythe | B62J 15/00 | 280/152.3 |
| 6,913,274 | B2 * | 7/2005 | Hsu | B62J 15/02 | 280/152.3 |
| 7,431,316 | B2 * | 10/2008 | Chuang | B62J 15/00 | 280/852 |
| 7,997,601 | B2 * | 8/2011 | Lin | B62J 15/00 | 280/852 |
| 8,172,246 | B2 * | 5/2012 | Bybee | B62J 15/02 | 280/852 |
| 8,191,912 | B2 * | 6/2012 | Serbinski | B62J 15/04 | 280/852 |
| 8,246,062 | B2 | 8/2012 | Hsu | | |
| 9,004,514 | B1 * | 4/2015 | McMahon | B62J 15/00 | 280/852 |
| 2003/0155736 | A1 * | 8/2003 | Ludvigsen | B62J 15/00 | 280/152.3 |
| 2017/0008586 | A1 * | 1/2017 | Danielson | B62J 15/02 | |

FOREIGN PATENT DOCUMENTS

| | | | |
|---|---|---|---|
| DE | 4232687 | A1 | 3/1994 |
| DE | 102005027108 | A1 | 1/2006 |
| DE | 202020004454 | U1 | 1/2021 |
| GB | 2493978 | A | 7/2013 |
| JP | 2001018872 | A | 1/2001 |
| TW | M555820 | U | 2/2018 |

OTHER PUBLICATIONS

International Preliminary Report on Patentability from corresponding International Application No. PCT/EP2022/080531, mailed on Mar. 6, 2023, 17 pages.

* cited by examiner

SPLASH GUARD ARRANGEMENT FOR A BICYCLE

TECHNICAL FIELD

The present invention relates to a splash guard arrangement for a bicycle and a method of attaching the splash guard arrangement to a bicycle.

BACKGROUND

When using a bicycle on a road, bike path or in the terrain, dirt, mud and/or water from the ground may be thrown up from a tyre of the bicycle. Therefore, most standard bicycles have fixedly mounted fenders or mud guards around a portion of the tyre to reduce, or preferably to avoid, dirt, mud and/or water from reaching the bicycle user, e.g. by being thrown from the rear tyre to a back of the bicycle user.

However, some bicycles, typically sport bicycles, do not have such fenders. The reason may be to save weight and/or to improve aerodynamics. This may not cause any problems when using the bicycle in good weather conditions. However, the bicycle user may get quite dirty and/or wet if there is dirt, mud and/or water present on the ground, which is thrown up by the tyre.

SUMMARY

The object of the present disclosure is to overcome or alleviate at least one of the disadvantages of the prior art, or to provide a useful alternative.

The object above is achieved by the subject-matter of the independent claims. Embodiments are set forth in the appended dependent claims, in the following description and in the drawings.

The present invention relates to a splash guard arrangement for a bicycle according to claim 1. The splash guard arrangement comprises a splash guard, a holder, a first fastener and a second fastener. The holder comprises a first, a second and a third portion. The second portion is arc-shaped and is located between the first portion and the third portion. The first portion comprises a first holder end portion and the third portion comprises a second holder end portion, the first and second holder end portions being located at opposite ends of the holder. The first fastener is adapted for attachment of the holder to a first frame component of the bicycle. The first fastener is adapted to be attached to the first holder end portion. The second fastener is adapted for attachment of the holder to a second frame component of the bicycle. The second fastener is adapted to be attached to the second holder end portion. The splash guard is transitable from a first shape to a second shape. The splash guard is configured to be held in the second shape by attachment to the second portion of the holder.

The holder is preferably mirror-symmetric. It may be substantially U-shaped. When the splash guard arrangement is attached to the bicycle, the first and third portions of the holder are located at respective sides of the wheel, while the second portion extends around the tyre of the wheel, e.g. substantially forming a semi-circle between the first and third portions of the holder. The shape of the holder is preferably adapted to the kind and size of bicycle the splash guard arrangement is intended for, and to the position of the bicycle, in which the holder is to be attached.

The holder may form a continuous body, i.e. there is no interruption following it from the attachment to the first frame component to the attachment to the second frame component. The holder may be a single unitary component. Such a holder is not compiled from a plurality of components initially being separate. Alternatively, the holder may be formed by two or more parts, e.g. halves, put together.

The holder is preferably made of a polymeric material. It may e.g. be made of glass-fibre reinforced nylon. The holder may be manufactured by injection-moulding. It may then be moulded in one piece. The shape of the holder end portions may be configured such that injection-moulding may be performed without any side-action. As an alternative, the holder may be compiled of two or more parts, which may be manufactured by injection-moulding.

The first and second holder end portions may be substantially straight. Alternatively, they may be curved. The second holder end portion may be a mirror image of the first holder end portion. The shapes of the holder end portions are preferably adapted to the kind and size of bicycle the splash guard arrangement is intended for, and to the position of the bicycle, in which the holder is to be attached.

The first and the second frame components of the bicycle may be seat stays or fork blades of a front fork. The first and the second holder end portions are the portions of the holder being closest to the frame component. Hence, the first and the second frame components of the bicycle supports the holder and thus supports the whole splash guard arrangement. Thereby, the first holder end portion and/or the second holder end portion may be attached perpendicularly to, or substantially perpendicularly, to the first and second frame components, respectively.

The splash guard is transitable from the first shape to the second shape, the first shape being different from the second shape. There may also be one or more shapes between the first shape and the second shape. When in the first shape, the splash guard may be untensioned and when in the second shape the splash guard is typically tensioned by means of the attachment to the bicycle. Untensioned means that no external force is applied. The splash guard is preferably also transitable from the second shape to the first shape, more preferably such that the splash guard is transitable back and forth between the two shapes. The splash guard may be attachable to the holder both in the second shape and in the first shape. The attachment in one of or both of the first and second shapes may be releasable, i.e. the splash guard may be released from the holder without any tool.

The second shape of the splash guard is used when the splash guard arrangement is attached to the bicycle. The splash guard arrangement then assumes a use configuration, in which the splash guard is angled relative to the holder. The range of selectable angles may be up to 160°, preferably up to 120°, preferably up to 90° and most preferably up to 70°.

Preferably, the splash guard is then attached to the holder at a location being at or adjacent to the highest point of the wheel, at least when covering the back wheel. In the second shape, the splash guard assumes a three-dimensional shape, which contributes to stabilizing the splash guard against bending and other mechanical forces. The splash guard is then typically held in tension, primarily in a transverse direction of the splash guard. When seen in the transverse direction of the splash guard, the splash guard may have a maximal height z in the range of $0\text{ mm}<z\leq 130\text{ mm}$, preferably $10\text{ mm}\leq z\leq 110\text{ mm}$, more preferably $20\text{ mm}\leq z\leq 100\text{ mm}$ and most preferably $25\text{ mm}\leq z\leq 80\text{ mm}$ when assuming the second shape.

The first shape may be used during pre-use transport of the splash guard arrangement, i.e. before it is used the first time. When seen in the transverse direction of the splash guard, the splash guard has a lower maximal height in the first shape than in the second shape. The first shape may be used when the splash guard arrangement is not in use on the bicycle, e.g. when stored. Hence, the user of the splash guard arrangement may make use of both the first and the second shapes. When in the first shape, the splash guard is typically untensioned. The first shape may be a flat shape, but typically the first shape is somewhere between the second shape and the flat shape regarding maximal height in the transverse direction.

The flat shape may be used during manufacturing of the splash guard. It is for example much easier to print on a flat surface than on a three-dimensional surface, as e.g. the first or second shape. Hence, a typical splash guard in the splash guard arrangement of the invention may assume the flat shape when the splash guard is manufactured, may assume the first shape, being different from the flat shape, when shipped to a store or to an end user and may then assume the second shape when attached to the holder when the splash guard arrangement is attached to the bicycle.

The splash guard may comprise, or be made of, an at least partly resilient material. The splash guard then springs back at least partly from the second shape when tension is released. It could go back to the flat shape but usually stays in the first shape being between the second shape and the flat shape regarding three-dimensionality. The splash guard is preferably made of a polymeric material, such as polypropylene (PP). It may be manufactured by die cutting.

The first and second fasteners may comprise, or be made of, an elastic material. They are preferably made of a polymeric material, such as thermoplastic polyurethane (TPU) or thermoplastic elastomers (TPE). They may be manufactured by injection-moulding.

The splash guard arrangement according to the invention provides a solution which is less complex than splash guard arrangements according to known technology. It has fewer components. It may e.g. consist of only four components: the splash guard, the holder, the first fastener and the second fastener. No extra components, such as e.g. screws, are needed for the attachment to the bicycle. As an alternative, the first and second fasteners may be manufactured together with the holder, e.g. in an injection moulding process, such that the splash guard arrangement according to the invention only consists of two components: a first component, the splash guard, and a second component being the holder with moulded-in first and second fasteners.

Since the splash guard may assume different shapes, the splash guard arrangement has a low space requirement during handling, storage and transport, due to the splash guard not having to assume the second shape with the largest maximal height in the transverse direction, but instead may assume the first shape with less maximal height and/or the flat shape. The splash guard arrangement accordingly fits well in flat packages, e.g. in a transport configuration described below or with the splash guard released from the holder.

The splash guard may be attached to the holder, e.g. in the first shape, during handling, storage and transport. Further, the first and second fasteners may be attached to the holder, during handling, storage and transport. This may be beneficial, since the components of the splash guard arrangement then can form a common unitary sales unit. There is also less risk of losing any one of the components during handling, storage and transport.

The splash guard arrangement according to the invention is quick and easy to attach to the bicycle, which may be performed without any tools. Furthermore, it is also quick and easy to release the splash guard arrangement from the bicycle.

The attachment to the bicycle may be at least partly resilient. Hence, if e.g. a mud lump or a small stone would accompany the tyre of the wheel up to the splash guard, the holder, and thus the whole splash guard arrangement, may resiliently shift position in relation to the tyre, such that the mud lump or stone may pass between the splash guard and the tyre without damaging any of them. This resiliency may result from resiliency of the holder, e.g. due to its material and/or shape, and/or from its attachment to the frame components.

The splash guard may be configured to be held in the second shape by releasable attachment to the second portion of the holder, preferably on top of the second portion of the holder. As an alternative or a complement, the splash guard may be held in the second shape by releasable attachment below the second portion of the holder, e.g. the splash guard being held by the arc shape of the second portion of the holder.

The term “releasable attachment” as used herein means that the attachment may be released by hand without any need of a tool. Thereby none of the components involved in the attachment are damaged or broken. Hence, they may be re-used in a new attachment or when repeating the same attachment. If instead non-releasably attached, the attachment may be permanent, e.g. by using glue, or a tool may be needed to release the attachment.

In case the splash guard is releasably attachable to the holder, the splash guard arrangement has a low space requirement during handling, storage and transport, when the splash guard is released from the second shape. The splash guard arrangement thereby fits well in flat packages, e.g. in the transport configuration described below or with the splash guard released from the holder. The splash guard may be releasably attached to the holder, e.g. in the first shape, during handling, storage and transport, e.g. in the transport configuration.

The first fastener may be adapted for releasable attachment of the holder to a first frame component of the bicycle and/or the second fastener may be adapted for releasable attachment of the holder to a second frame component of the bicycle. Thereby, the first and second fastener are undamaged by the release operation from the frame component and may be used again for attachment to the same bicycle or to another bicycle.

The first fastener is adapted to be releasably or non-releasably attached to the first holder end portion. If releasably attached, the first fastener may be removed by hand, without any tool. This makes it easy to replace the first fastener, if e.g. another kind of first fastener is desirable, a longer first fastener is desirable, or if the first fastener is worn out. If non-releasably attached, the first fastener may be permanently attached to the first holder end portion, e.g. by glue, or a tool may be needed to remove the first fastener from the first holder end portion. The same goes for the second fastener relative to the second holder end portion.

The second portion of the holder may comprise a first and a second side attachment means spaced apart from a top of the second portion and located at opposite sides of the top, and the splash guard may comprise a first and a second side attachment means adapted to cooperate with the first and second side attachment means of the holder. The first and second side attachment means of the holder and of the splash guard are adapted to hold the splash guard in the second shape.

The first and second side attachment means of the holder are preferably located symmetrically at either sides of the top of the second portion of the holder. Their distance from the top should preferably be adapted to the maximal height of the splash guard as seen in the transverse direction. Hence, the projected maximal distance x from the top to a line going through the centres of side attachment means may be in the range of 0 mm<x≤120 mm, preferably 10 mm≤x≤100 mm, more preferably 15 mm≤x≤90 mm and most preferably 20 mm≤x≤70 mm. Typically, the first and second side attachment means are located in the second portion just before it transforms into the first and third portions.

There may be more than one side attachment means at each side of the top of the second portion of the holder. The locations of these may be adapted to cooperate with different sizes and shapes of the splash guard.

The first and second side attachment means of the holder may be of a male type, e.g. a first and a second attachment protrusion. The first and second side attachment means of the splash guard may be of a mating female type, e.g. a first and a second attachment opening adapted to receive the first and second attachment protrusions. As an alternative, the splash guard may comprise the male side attachment means and the holder may comprise the female side attachment means.

As an alternative or a complement to the male/female side attachment means, the side attachment means of the holder and the corresponding ones of the splash guard may be a hook-and-loop attachment. As yet an alternative, the side attachment means of the holder and the corresponding ones of the splash guard may comprise a snap-in connection, a pin connection, a rivet connection, a screw connection or a clip connection.

The side attachment means of the splash guard may be located at a front end portion of the splash guard, especially if intended for a bicycle with large wheels, but may be closer to a longitudinal centre of the splash guard if intended for a bicycle with small wheels. The front end and the front end portion of the splash guard is determined in relation to the normal drive direction of the bicycle.

The second portion of the holder may comprise a central attachment means, e.g. a central protrusion, and the splash guard may comprise a corresponding central attachment means, e.g. an opening adapted to receive the central protrusion. The central attachment means may be of the same type as previously mentioned for the side attachment means.

When provided, the central attachment means is located between the first and second side attachment means, typically located at or adjacent to the top of the second portion. The central attachment means helps to hold the splash guard in the second shape. It helps to give a stable attachment by at least three attachment points, i.e. at the respective side attachment means and at the central attachment means.

The splash guard may comprise at least two central attachment means spaced apart in a longitudinal direction of the splash guard and/or at least two side attachment means spaced apart in the longitudinal direction of the splash guard. There may be a plurality of central attachment means, e.g. 2, 3, 4 or 5. As an alternative or a complement, there may be a plurality of side attachment means, e.g. 2, 3, 4 or 5. By having at least two of the at least one of the central attachment means and the side attachment means, it is possible to select an angle of splash guard versus the wheel of the bicycle by offering different relative positions between the splash guard and the holder. The range of selectable angles may be up to 160°, preferably up to 120°, preferably up to 90° and most preferably up to 70°. This may also offer the possibility of making a longitudinal translation of the splash guard relative to the holder.

The splash guard may comprise a rear fold line close to a rear end portion of the splash guard, preferably the rear fold line being curved rearwards. The rear end and the rear end portion of the splash guard is determined in relation to the normal drive direction of the bicycle. The rear fold line may help to hold a rear end of the splash guard in a desired three-dimensional shape, e.g. tipping it upwards, thereby helping to stabilize the splash guard against bending and other mechanical forces. There may also be one or more longitudinal fold lines, extending in the longitudinal direction of the splash guard, or substantially in the longitudinal direction of the splash guard, e.g. along an edge of the splash guard. The more longitudinal fold line/s may extend along at least 40% of the length of the splash guard, preferably at least 50% and more preferably at least 70% of the length. One or both ends of the longitudinal fold line/s may have a curved end.

As mentioned above, the splash guard may be configured to assume a flat shape which may be the same or different from the first shape. The flat shape is different from the second shape.

The first fastener may comprise a first strip being attachable to the first holder end portion and/or the second fastener may comprise a second strip being attachable to the second holder end portion, preferably the first strip and/or the second strip being elastic. The first and second strips may be used for the releasable attachment to the respective first and second frame component.

The first and/or second strip may comprise a respective series of openings adapted to cooperate with a respective protrusion comprised in the first and second holder end portions to thereby select an active portion of the respective first and/or second strip. The active portion is the portion of the strip being used for the attachment. There may also be a portion of the strip being outside of the protrusion, i.e. more distal to the frame component, which is not active for the attachment. By using a series of openings and/or using the elasticity of the first and/or second strip, the active portion can be adapted to the circumference of the frame component. Hence, if the splash guard arrangement is attached to a frame component with a larger circumference, a longer portion of the first and/or second strip may form the active portion.

The first holder end portion may comprise an opening or a slot, the first strip being adapted to be inserted through the opening or the slot, and/or the second holder end portion may comprise an opening or a slot, the second strip being adapted to be inserted through the opening or the slot. Thereby the first and/or second strip can be attached to the respective holder end portion without a tool. It also makes it easy to replace the strip, if e.g. a longer strip is desirable or if the strip is worn out.

The first fastener may comprise a first head portion adapted to cover an end of the first holder end portion, and/or the second fastener may comprise a second head portion adapted to cover an end of the second holder end portion. This will help to prevent wear on the frame component, e.g. avoiding scratches. It will also help to give appropriate friction to the frame component, such that the holder does not slide along the frame component.

The first fastener may be constituted by the first head portion and the first strip, but there may also be another part between the first head portion and the first strip. Correspondingly, the second fastener may be constituted by the second head portion and the second strip, but there may also be another part between the second head portion and the second strip.

The first and the third portions of the holder may comprise a respective curved section, preferably the curved sections being located next to the arc-shaped second portion. When attached to the bicycle, the first and the third portions of the holder are curved in a respective plane of the bicycle in order to obtain the desired position of the splash guard at the top of the wheel. Hence, when comparing the orientation of the holder end section to the orientation of an opposite end section of the first portion of the holder, or the corresponding comparison for the third portion, they may differ by an angle $\alpha$ being in the range of $0° \leq \alpha \leq 70°$, with 0° difference meaning that the first or third portion of the holder being straight, preferably $0° \leq \alpha \leq 60°$, more preferably $10° \leq \alpha \leq 50°$.

The splash guard may be attachable to the holder in the transport configuration of the splash guard arrangement. The splash guard may then be held by the side attachment means. In the transport configuration, the holder and the splash guard assume a rather flat configuration, in which the splash guard is rather aligned with the holder in such a direction, that a rear end of the splash guard is as close to the holder end portions as possible considering the different lengths of the holder and the splash guard. This differs from the use configuration of the splash guard arrangement, in which the rear end portion of the splash guard is distant from the holder with the splash guard being attached to the holder. In the transport configuration, the splash guard arrangement occupies less space than in the use configuration, which may be suitable for transport, storage and in a shop. In the transport configuration, a plurality of splash guard arrangements may be arranged on top of each other in a stack.

The present disclosure further relates to a method of attaching the splash guard arrangement as described herein to a bicycle. The method comprises, or consists of,

- attaching the first fastener around the first frame component of the bicycle,
- attaching the second fastener around the second frame component of the bicycle,
- attaching the splash guard on the second portion of the holder, thereby holding the splash guard in the second shape.

The steps may be performed in any order. The steps may be performed in sequence or at least partly in parallel. The method can be performed by hand, i.e. the step of attaching the first fastener around the first frame component, attaching the second fastener around the second frame component and attaching the splash guard on the second portion of the holder may be performed without any need of a tool. Further, the attachments of the first fastener around the first frame component, of the second fastener around a second frame component and of the splash guard to the holder may be released by hand, i.e. without any need of a tool.

The splash guard may be attached on top of the second portion of the holder. As an alternative or a complement, the splash guard may be attached below the second portion of the holder, e.g. the splash guard being held by the arc shape of the second portion of the holder.

The step of attaching the splash guard on the second portion of the holder may comprise attaching the first and the second side attachment means of the splash guard at the first and the second side attachment means of the holder. This may be performed without any tools.

The method may comprise the step of attaching the central attachment means of the splash guard at the central attachment means of the holder. This may be performed without any tools. If more than one central attachment means of the splash guard and/or of the holder, this step may be used to select a suitable angle from a range of possible angles between the splash guard and the holder, such that the splash guard may assume a desirable angle in relation to the wheel of the bicycle. The range of selectable angles may be up to 160°, preferably up to 120°, preferably up to 90° and most preferably up to 70°.

The method may also comprise a step of attaching the first fastener to the first holder end portion and a step of attaching the second fastener to the second holder end portion. This may be performed without any tools.

The present disclosure further relates to a method of attaching the splash guard to the holder in the transport configuration described herein by attaching the splash guard on the second portion of the holder, e.g. by attaching the first and the second side attachment means of the splash guard at the first and the second side attachment means of the holder in the way described herein. This may be performed without any tools.

The method may further comprise method steps corresponding to the details of the splash guard arrangement described herein.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will in the following be exemplified by embodiments. It should however be realized that the embodiments are included in order to explain principles of the invention and not to limit the scope of the invention, defined by the appended claims. Details from two or more of the embodiments may be combined with each other.

Figure 1:
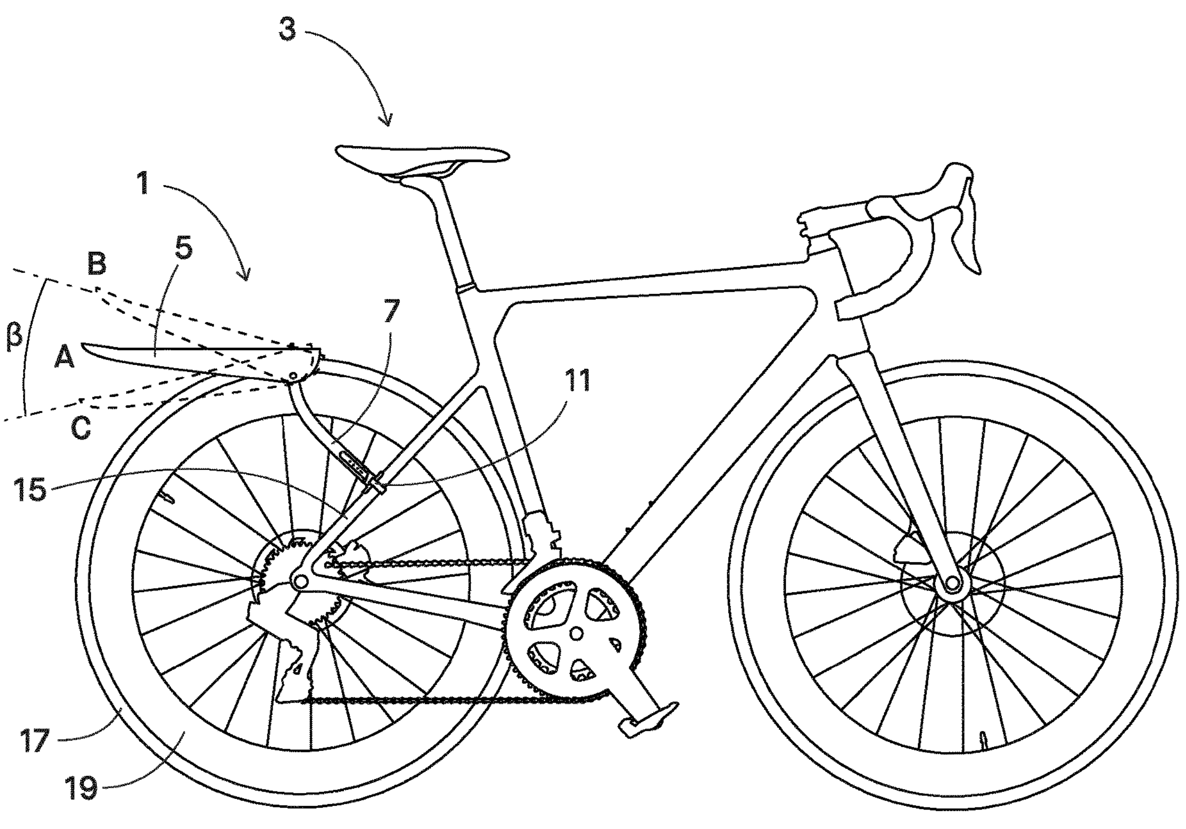
FIG. 1 illustrates a splash guard arrangement according to a first embodiment of the invention attached to a bicycle.

FIG. 1 illustrates a splash guard arrangement 1 according to a first embodiment of the invention attached to a bicycle 3. The splash guard arrangement 1 comprises a splash guard 5, a holder 7, a first fastener 9 and a second fastener 11. The first fastener 9 is used to releasably attach the holder 7 to a first frame component of the bicycle 3, in the illustrated embodiment being a first seat stay 13. In a corresponding way, the second fastener 11 is used to releasably attach the holder 7 to a second frame component of the bicycle 3, in the illustrated embodiment being a second seat stay 15. In the illustrated side view of the bicycle 3, the first fastener 9 and the first seat stay 13 are hidden. The first and second seat stays 13, 15 support the holder 7 and thus the whole splash guard arrangement 1. In the illustrated embodiment, the holder 7 is perpendicular to, or substantially perpendicular to, the first and second frame components 13, 15 at the attachment.

In FIG. 1, the splash guard arrangement 1 assumes a use configuration. The splash guard is angled relative to the holder 7, illustrated as position A in FIG. 1, such that the splash guard 5 is placed in a position being suitable for collecting mud and/or water from the ground being thrown up from a tyre 17 of a wheel 19 of the bicycle 3. Preferably, an angle between the splash guard 5 and the holder 7 is selectable, such that a user of splash guard arrangement 1 can select a suitable angle from a plurality of possible angles in an angle range, illustrated as exemplary positions A, B and C in FIG. 1. The range β of selectable angles, i.e. the angle difference between end positions of the selectable range of positions, may be up to 160°, preferably up to 120°, preferably up to 90° and most preferably up to 70°. It is further described below how to select the desirable angle. The splash guard 5 is attached to the holder 7 at a location being at or adjacent to the highest point of the wheel 19, which has been found beneficial in order to collect mud and/or water from the ground being thrown up from the tyre 17.

The splash guard 5 is transitable from a first shape to a second shape. In the use configuration, the splash guard 5 is attached to the holder 7 in the second shape, in which the splash guard 5 assumes a three-dimensional shape. The first and second shapes are further explained below. The splash guard 5 is held in the second shape by means of its attachment to the holder 7. The splash guard 5 is typically held in tension primarily in a transverse direction T of the splash guard 5, as explained in conjunction with FIGS. 5-6 below. The three-dimensional shape of the splash guard 5 contributes to stabilizing it against bending and other mechanical forces.

Figure 2:
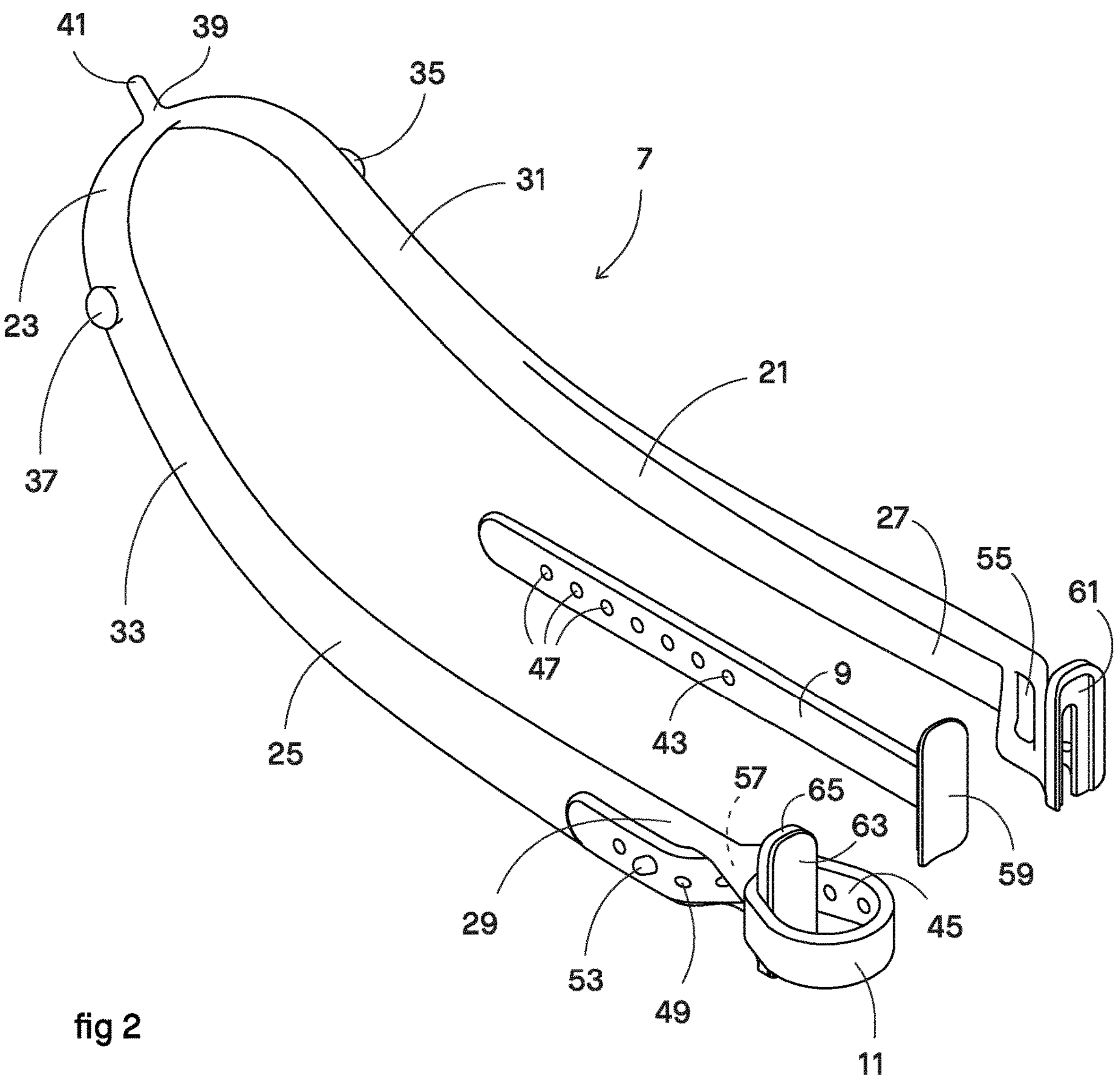
FIG. 2 illustrates the holder, the first fastener and the second fastener of the splash guard arrangement in a perspective view.
Figure 3:
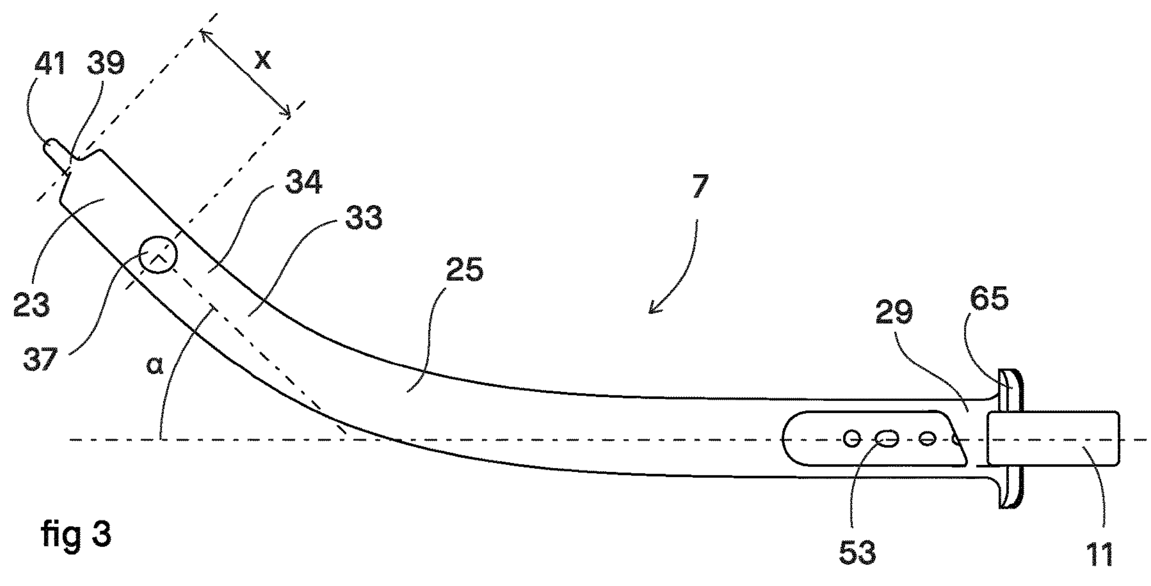
FIG. 3 illustrates the holder and the second fastener in a side view.
Figure 4:
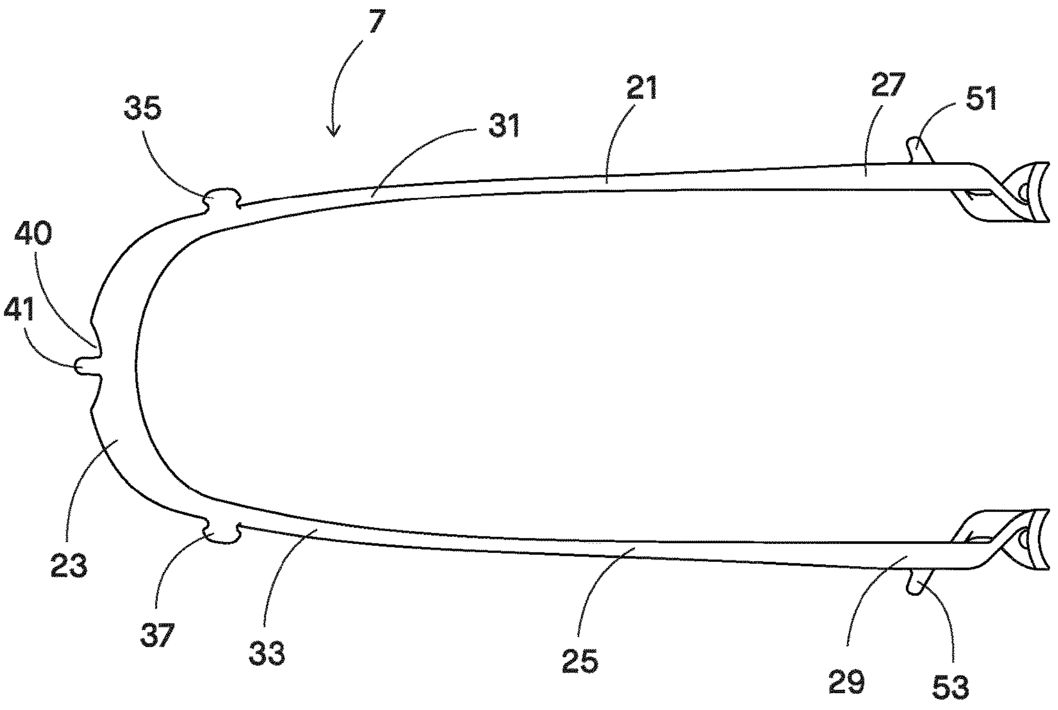
FIG. 4 illustrates the holder in a top view.

FIG. 2 illustrates the holder 7, the first fastener 9 and the second fastener 11 in a perspective view. The first fastener 9 is shown separate from the holder 7, while the second fastener 11 is shown attached to the holder 7. The first fastener 9 is to be attached to the holder 7 in a corresponding way as the second fastener 11. FIG. 3 shows a side view of the holder 7 and the second fastener 11, while FIG. 4 shows a top view of the holder 7. The illustrated embodiment shows an example, in which the fasteners 9, 11 are releasably attached to the holder 7, i.e. they can be removed without a tool. Alternatively, the fasteners 9, 11 may be non-releasably attached to the holder 7. In that case, the fasteners 9, 11 may be permanently attached to the first holder end portion, e.g. by glue, or a tool may be needed to remove the fasteners 9, 11 from the holder 7.

In the illustrated embodiment, the holder 7 is mirror-symmetric, being substantially U-shaped. The holder 7 forms a continuous body, i.e. it is a unitary body without any interruption. The holder 7 comprises a first 21, a second 23 and a third portion 25. The second portion 23 is arc-shaped and is located between the first portion 21 and the third portion 25. When the splash guard arrangement 1 is attached to the bicycle 3, as illustrated in FIG. 1, the first 21 and third 25 portions of the holder 7 are located at respective sides of the wheel 19, while the second portion 23 goes around the tyre 17 of the wheel 19, e.g. substantially forming a semi-circle between the first 21 and third 25 portions of the holder 7. In the illustrated embodiment, the first 21 and third 25 portions of the holder 7 form mirror images of each other. More generally, their shapes and sizes are to be adapted to the bicycle 3, in which they are to be used, and to the position of the bicycle 3, in which it is to be attached.

The first portion 21 of the holder 7 comprises a first holder end portion 27 and the third portion 25 comprises a second holder end portion 29, the first and second holder end portions 27, 29 being located at opposite ends of the holder 7. The first fastener 9 is adapted to be attached to the first holder end portion 27. The second fastener 11 is attached to the second holder end portion 29.

In the illustrated embodiment, the first holder end portion 27 and the second holder end portion 29 are substantially straight, both when seen in the side view of FIG. 3 and the top view of FIG. 4. They form mirror images of each other. More generally, the shapes and sizes of the first and second end portions 27, 29 are to be adapted to the bicycle 3, in which they are to be used, and to the position of the bicycle 3, in which it is to be attached.

In the illustrated embodiment, the first 21 and third 25 portions of the holder 7 comprise a respective curved section 31, 33, being located next to the arc-shaped second portion 23, best seen in FIG. 4. When attached to the bicycle 3, the first 21 and third 25 portions of the holder 7 are curved to a substantially vertical direction of the bicycle 3 in order to obtain the desired position of the splash guard 5 at the top of the wheel 19, as may be spotted in FIG. 1. Hence, when comparing the orientation of the second holder end section 29 to the orientation of an opposite end section 34 of the third portion 25, as is illustrated, or the corresponding comparison for the first portion 25, they may differ by an angle α being in the range of $0° \leq \alpha \leq 70°$, preferably $0° \leq \alpha \leq 60°$, more preferably $10° \leq \alpha \leq 50°$, with 0° difference meaning that the first or third portion 25, 29 of the holder 7 being straight.

The second portion 23 of the holder 7 comprises a first 35 and a second 37 side attachment means spaced apart from a top 39 of the second portion 23, located at opposite sides of the top 39. The side attachment means 35, 37 are adapted to cooperate with a first and a second side attachment means 71, 73 of the splash guard 5, which are described below in conjunction with FIGS. 5 and 6. The first and second side attachment means 35, 37 of the holder 7 are adapted to hold the splash guard 5 in the second shape. In the illustrated embodiment, the first and second side attachment means 35, 37 are in the form of a first 35 and a second 37 attachment protrusion, located symmetrically at either sides of the top 39 of the second portion 23 of the holder 7. Typically, the first and second side attachment means 35, 37 are located in the second portion 23 just before it transforms into the first and third portions 21, 25.

The second portion 23 of the holder 7 comprises a central attachment means 41, illustrated as a central protrusion 41. The splash guard 5 comprises a corresponding central attachment means 75, e.g. an opening adapted to receive the central protrusion 41, as is described below in conjunction with FIGS. 5 and 6. The central attachment means 41 is located between the first and second side attachment means 35, 37, at the top 39 of the second portion 23. The central attachment means 41 helps to hold the splash guard 5 in the second shape, since it helps to give a stable attachment by at least three attachment points, i.e. at the respective side attachment means 35, 37 and at the central attachment means 41.

A projected maximal distance x of the first and second side attachment means 35, 37 from the top 39 should preferably be adapted to a maximal height z of the splash guard 5 as seen in a transverse direction T, cf. FIGS. 3 and 7. Hence, the projected maximal distance x from the top 39 may be in the range of 0 mm<x≤120 mm, preferably 10 mm≤x≤100 mm, more preferably 15 mm≤x≤90 mm and most preferably 20 mm≤x≤70 mm. The projected maximal distance x is determined as the distance between a line going through the centres of the side attachment means 35, 37 and the top 39, see FIG. 3.

In the perspective of the top view of FIG. 4, it can be spotted that in the illustrated embodiment, there is an indentation 40 close to the top 39. The indentation may make manufacturing of the holder more easy.

In the illustrated embodiment, see FIG. 2, the first fastener 9 comprises a first strip 43 being attachable to the first holder end portion 27 and the second fastener 11 comprises a second strip 45 being attachable to the second holder end portion 29. The first and second strips 43, 45 are elastic and are used for the releasable attachment to the first and second frame components, e.g. the first and second seat stays 13, 15 seen in FIG. 1. The first and second strips 43, 45 comprise a respective series of openings 47, 49 adapted to cooperate with a respective protrusion 51, 53 comprised in the first and second holder end portions 27, 29 to thereby select an active portion of the respective first and second strips 43, 45. The active portion is the portion of the strip 43, 45 being used for the attachment. There is further a portion of the strip 43, 45 extending past the protrusion 51, 53, i.e. more distal to the frame component, which is not active for the attachment. By using a series of openings 47, 49 and/or using the elasticity of the first and/or second strip 43, 45, the length of the active portion can be adapted to the circumference of the frame component. Hence, if the splash guard arrangement 1 is attached to a frame component with a larger circumference, a longer portion of the first and/or second strip 43, 45 may form the active portion.

The first holder end portion 27 comprises an opening 55 or a slot, the first strip 43 being adapted to be inserted through the opening 55 or the slot, and the second holder end portion 29 comprises an opening 57 or a slot, the second strip 45 being adapted to be inserted through the opening 57 or the slot. Thereby the first and second strips 43, 45 can be attached to the respective holder end portion 27, 29 without a tool. It also makes it easy to replace the strip 43, 45, if e.g. a longer strip is desirable or if the strip is worn out.

The first fastener 9 comprises a first head portion 59 adapted to cover an end 61 of the first holder end portion 27, and the second fastener 11 comprises a second head portion 63 adapted to cover an end 65 of the second holder end portion 29. This will help to prevent wear on the frame component 13, 15, e.g. avoiding scratches. It will also help to give appropriate friction to the frame component 13, 15, such that the holder 7 does not slide along the frame component 13, 15.

The attachment of the holder 7 to the bicycle 3 may be at least partly resilient. Hence, if e.g. a mud lump or a small stone would accompany the tyre 17 up to the splash guard 5, the holder 7, and thus the whole splash guard arrangement 1, may resiliently shift position in relation to the tyre 17, such that the mud lump or stone may pass between the splash guard 5 and the tyre 17 without damaging any of them. This resiliency may result from resiliency of the holder 7 due to its material and/or from its attachment to the frame components 13, 17, e.g. by the elasticity of the first and second strip 43, 45.

Figure 5:
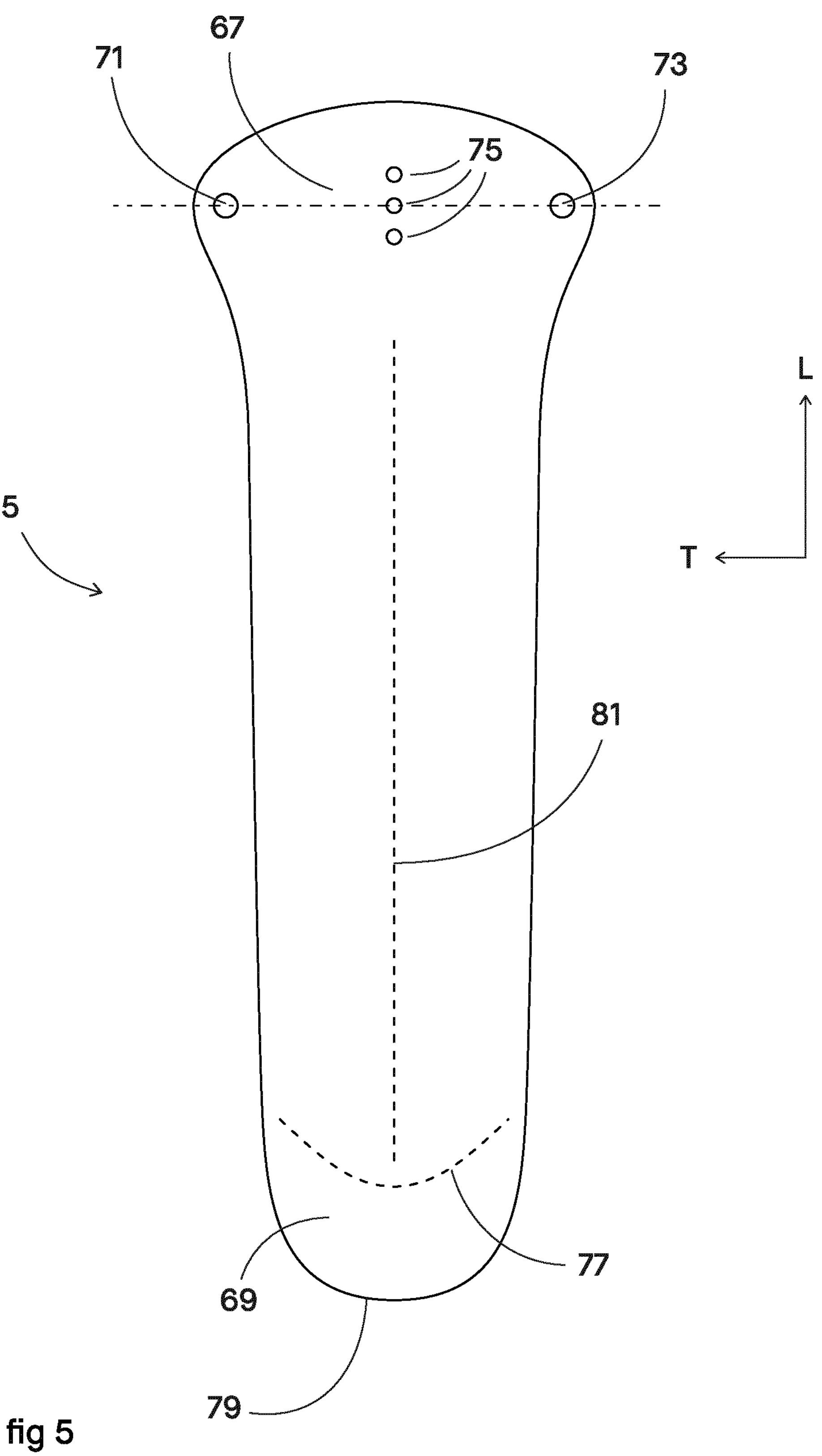
FIG. 5 illustrates the splash guard of the splash guard arrangement in a top view in a flat shape.
Figure 6:
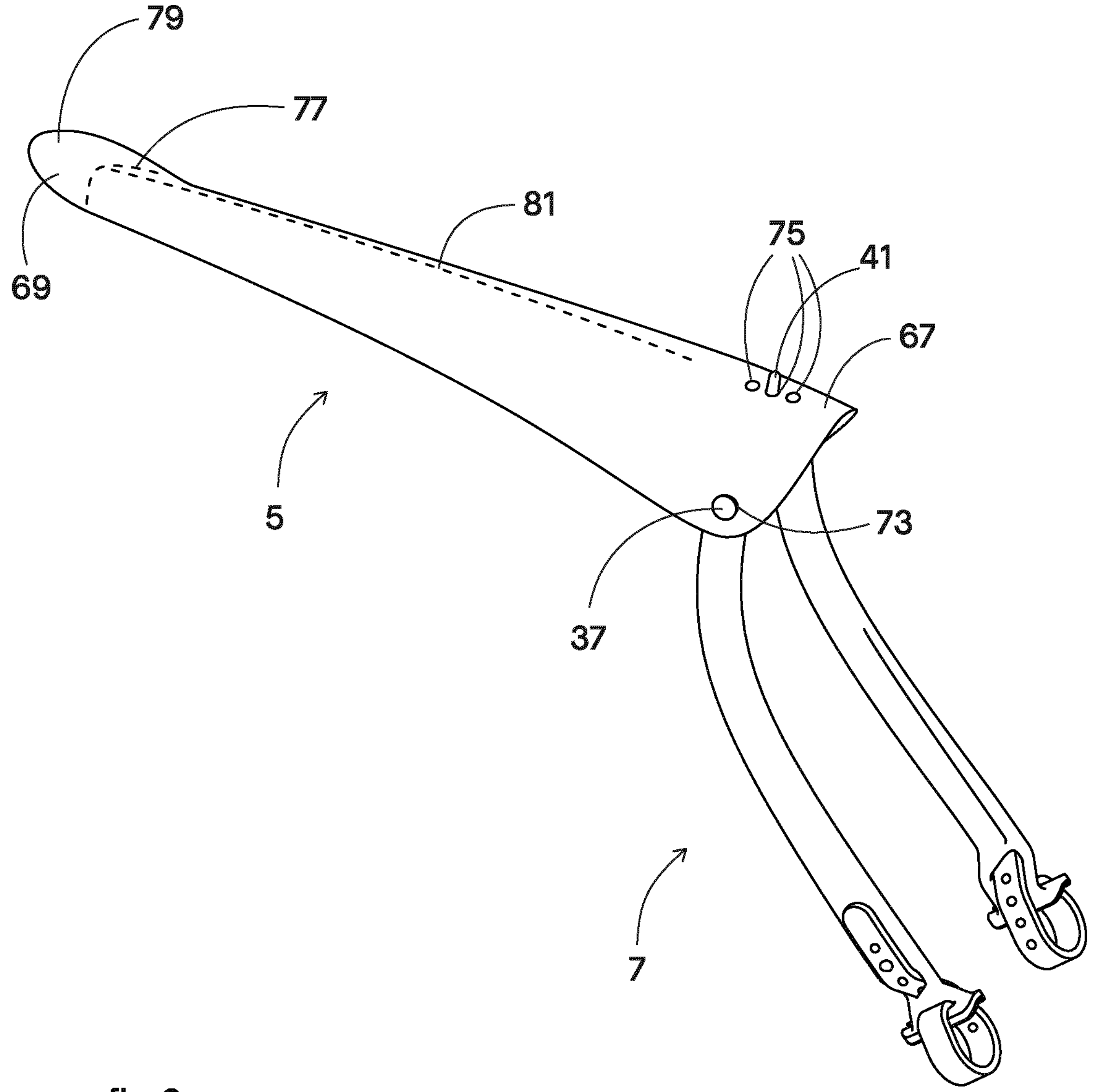
FIG. 6 illustrates the splash guard attached to the holder.
Figure 7A:
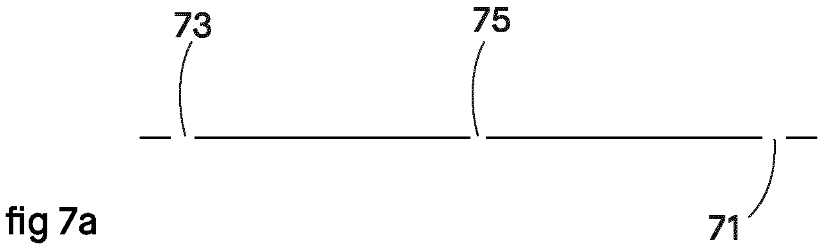
FIG. 7*a-c* illustrate cross-sectional views of the splash guard in the flat shape, a first shape and a second shape.
Figure 7B:
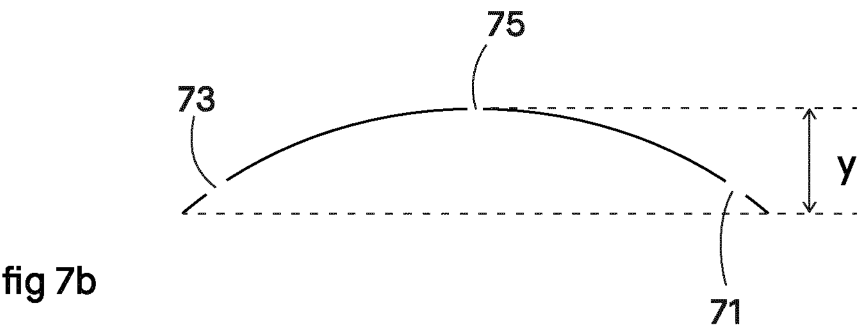
Figure 7C:
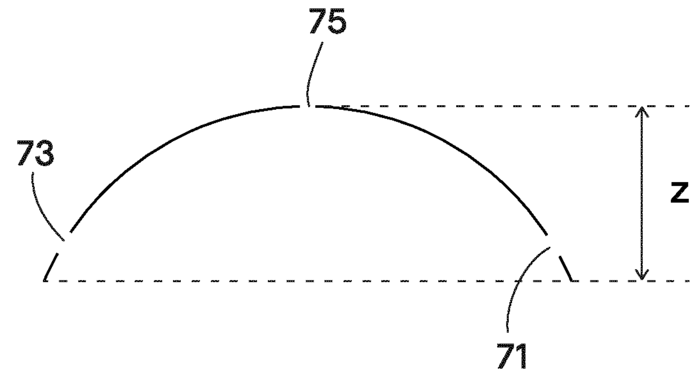

FIG. 5 illustrates the splash guard 5 in a flat shape seen in a top view. FIG. 6 illustrates the splash guard 5 in the second shape when attached to the holder 7, i.e. the use configuration shown in FIG. 1. FIGS. 7*a-c* illustrate transverse cross-sections of the splash guard 5 along a dashed line, indicated in FIG. 5, corresponding to where the splash guard 5 is attached to the holder 7. FIG. 7*a* shows the flat shape, FIG. 7*b* a first shape and FIG. 7*c* the second shape.

The splash guard 5 is transitable from the first shape to the second shape. There may also be one or more shapes between the first shape and the second shape. The splash guard 5 is preferably also transitable from the second shape to the first shape, such that the splash guard 5 is transitable back and forth between the two shapes. The splash guard 5 may be attachable to the holder both in the second shape and in the first shape. When in the first shape, the splash guard is typically untensioned and when in the second shape the splash guard is typically tensioned.

The splash guard 5 may comprise of, or be made of, an at least partly resilient material. The splash guard 5 then springs back at least partly from the second shape when tension is released. It could go back to the flat shape, but usually stays in the first shape, being an untensioned shape being between the second shape and the flat shape.

The splash guard 5 has a longitudinal direction L and a transverse direction T, being perpendicular to each other. The splash guard 5 is much longer in the longitudinal direction L than in the transverse direction T. When the splash guard arrangement 1 is attached to the bicycle 3, the longitudinal direction L substantially coincides with a normal drive direction of the bicycle 3. The splash guard 5 comprises a front end portion 67 and a rear end portion 69, front and rear being determined in relation to the normal drive direction of the bicycle 3.

The front end portion 67 comprises a first side attachment means 71 and a second side attachment means 73, in the form of openings, adapted to cooperate with the first and second side attachment means 35, 37 of the holder 7, illustrated as protrusions in FIGS. 2-4. Hence, the first and second side attachment means 35, 37 of the holder 7 and the first and second side attachment means 71, 73 of the splash guard 5 have corresponding locations and have shapes adapted to be attached to each other. In the illustrated embodiment, the first and second protrusions 35, 37 are inserted through the corresponding openings 71, 73, as can be seen in FIG. 6. Thereby, the splash guard 5 is held in the second shape by means of its attachment to the holder 7. The splash guard 5 is typically held in tension primarily in the transverse direction T of the splash guard 5, as is illustrated.

The splash guard 5 further comprises a plurality of spaced-apart central attachment means, illustrated as central openings 75, wherein each opening 75 is adapted to receive the central protrusion 41 of the holder 7. By being central means that the openings 75 are located along a longitudinal centre-line of the splash guard 5. Using a central attachment means 75 helps to hold the splash guard 5 in the second shape, as shown in FIG. 6. It helps to give a stable attachment by at least three attachment points, i.e. at the respective side attachment means 71, 73 and at the central attachment means 75.

By having at least two central attachment means 75, shown as three openings 75 in the illustrated embodiment, it is possible to select the angle of the splash guard 5 versus the wheel 19 of the bicycle 3, please see FIG. 1 showing three such positions A, B and C. The plurality of spaced-apart central attachment means 75 may, as a complement or an alternative, be used to make a longitudinal translation of the splash guard 5 relative to the holder 7.

The splash guard 5 comprise a rear fold line 77 close to the rear end portion 69, preferably the rear fold line 77 being curved rearwards, as is illustrated, see FIG. 5. The rear fold line 77 may help to hold a rear end 79 of the splash guard in a three-dimensional shape, e.g. tipping it upwards, thereby helping to stabilize the splash guard 5 against bending and other mechanical forces.

The splash guard 5 further comprises a longitudinal fold line 81. It extends along the longitudinal centre-line in the longitudinal direction L of the splash guard 5. Typically it starts spaced apart from the central attachment means 75 and extends to the rear fold line 77, as in the illustrated embodiment.

FIGS. 7*a-c* shows a series of shapes of the splash guard 5 when seen in a transverse cross-sectional view. The cross-sections are made along the dashed line indicated in FIG. 5, corresponding to where the splash guard 5 is attached to the holder 7. The cross-sections hence show the positions of the first and second side attachment means 71, 73 and of one of the central attachment means 75.

FIG. 7*a* shows the flat shape, which may be used when manufacturing the splash guard 5. The flat shape is suitable for printing of the splash guard 5. The splash guard 5 may be manufactured by die cutting.

FIG. 7*b* illustrates the first shape, typically with the splash guard 5 being untensioned. The splash guard 5 may then have a maximal height y in the range of 0 mm<y≤80 mm, preferably 0 mm y≤60 mm, more preferably 5 mm≤y≤40 mm and most preferably 5 mm≤y≤25 mm.

FIG. 7*c* illustrates the second shape, in which the splash guard 5 is attached to the holder 7. The splash guard 5 may then have a maximal height z in the range of 0 mm<z≤130 mm, preferably 10 mm≤z≤110 mm, more preferably 20 mm≤z≤100 mm and most preferably 25 mm≤z≤80 mm, when assuming the second shape. The maximal height z is typically assumed at the position where the splash guard 5 is attached to the holder 7.

Figure 8:
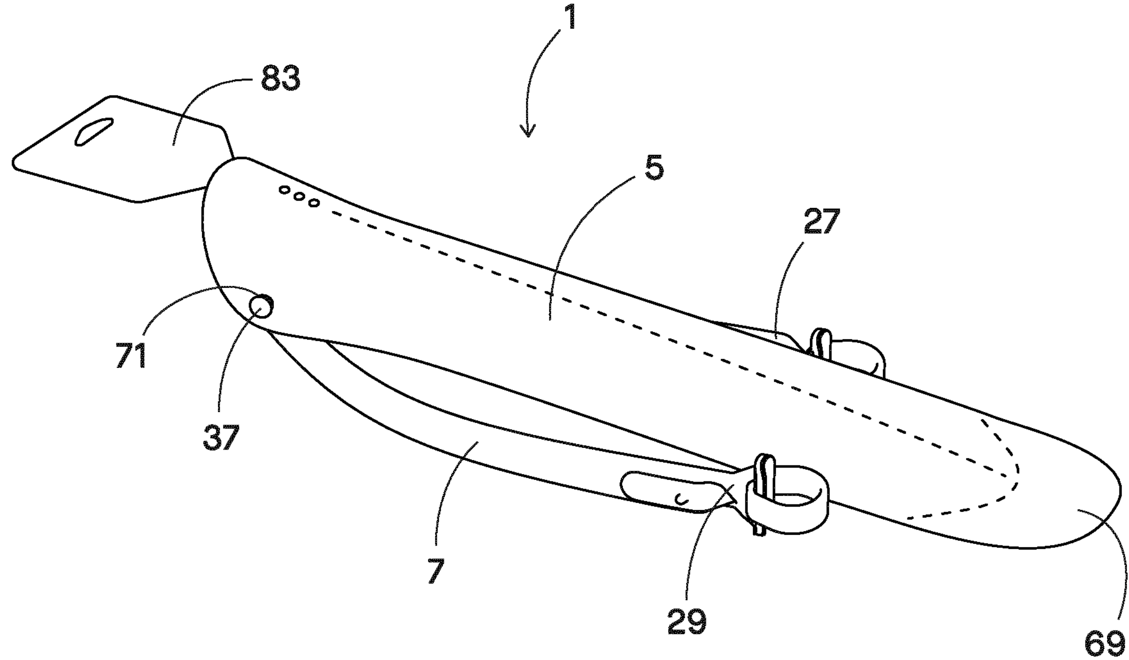
FIG. 8 illustrates the splash guard arrangement in a transport configuration.

In the illustrated embodiment, the splash guard 5 is alternatively attachable to the holder 7 in a transport configuration of the splash guard arrangement 1, see FIG. 8. The splash guard 5 is then held by the side attachment means of the holder 7 and the splash guard 5. Hence, the first and second protrusions 35, 37 are inserted through the corresponding openings 71, 73. The central attachment means 41, 75 are not in use. In the transport configuration, the holder 7 and the splash guard 5 assume a rather flat configuration, in which the splash guard 5 is rather aligned with the holder 7 in such a direction, that the rear end portion 69 of the splash guard 5 is as close to the holder end portions 27, 29 as possible considering the different lengths of the holder 7 and the splash guard 5. This differs from the use configuration of the splash guard arrangement 1, in which the rear end portion 69 of the splash guard 5 is distant from the holder 7 with the splash guard 5 being attached to the holder 7, see FIG. 1. In the transport configuration, the splash guard arrangement 1 occupies less space than in the use configuration, which may be suitable for transport, storage and in a shop.

As an option, illustrated in FIG. 8, the splash guard 5 may comprise a tag 83, e.g. being used when the splash guard arrangement 1 is hung up for display in a shop. The tag 83 is easy to remove from the rest of the splash guard 5, e.g. by tearing it away in a tear line.

Figure 9:
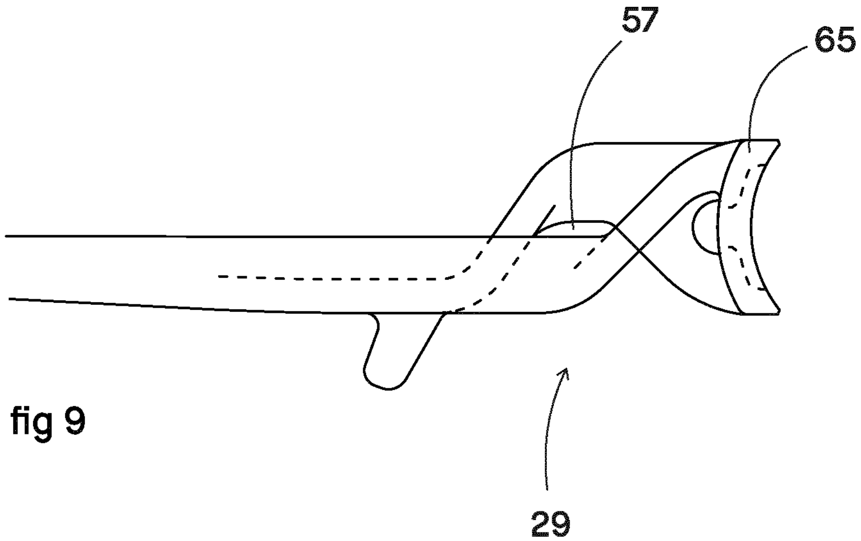
FIG. 9 illustrates details of a second holder end portion.
Figure 10:
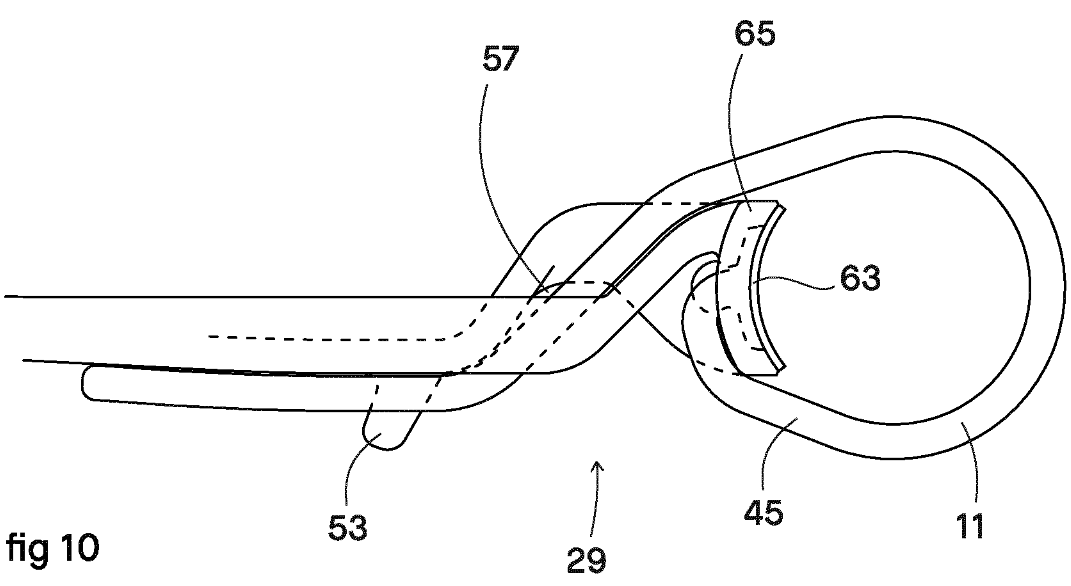
FIG. 10 illustrates the second holder end portion with the second fastener attached.

FIGS. 9 and 10 show a detailed view of the second holder end portion 29 without the second fastener 11, see FIG. 9, and with the second fastener 11 attached to the second holder end portion 29, see FIG. 10. Even if illustrated for the second holder end portion 29, the details are corresponding for the first holder end portion 27.

The end 65 of the second holder end portion 29 has a curved shape adapted to fit on the second frame component, e.g. on the second seat stay 15 illustrated in FIG. 1. Hence the curvature of the end 65 is adapted to the cross-sectional shape of the second frame component 15. The protrusion 51 sticks out from the rest of the second holder end portion 29. It is configured to receive one of the openings in the series of openings 49.

FIG. 10 illustrates how the second fastener 11 is attached to the second holder end portion 29. The second head portion 63 of the second fastener 11 covers the end 65 of the second holder end portion 29. As mentioned above, this will help to prevent wear on the frame component 13, 15, e.g. avoiding scratches. It will also help to give appropriate friction to the frame component 13, 15, such that the holder 7 does not slide along the frame component 13, 15. The second head portion 63 follows the curvature of the end 65. Typically the second head portion 63 is made of the same material as the elastic second strip 45, such that the second head portion 63 can easily be curved or bent along the curvature of the end 65.

In the illustrated embodiment, the second fastener 11 is constituted by the second strip 45 and the second head portion 63. If following the second strip 45 from the second head portion 63, the second strip 45 first enters into the second holder end portion 29, turns about 180° and then goes around the second frame component 15. Thereafter the second strip 45 goes through the opening 57 in the second holder end portion 29 and comes out on the side of the second holder end portion 29 having the protrusion 53. An opening 49 of the second strip 45 is inserted over the protrusion 53 to select the active portion of the second strip 45. Preferably, the second strip 45 is stretched before being anchored to the protrusion 53, such that the second strip 45 is held in tension, when the holder 7 is attached to the frame component 15.

Figure 11:
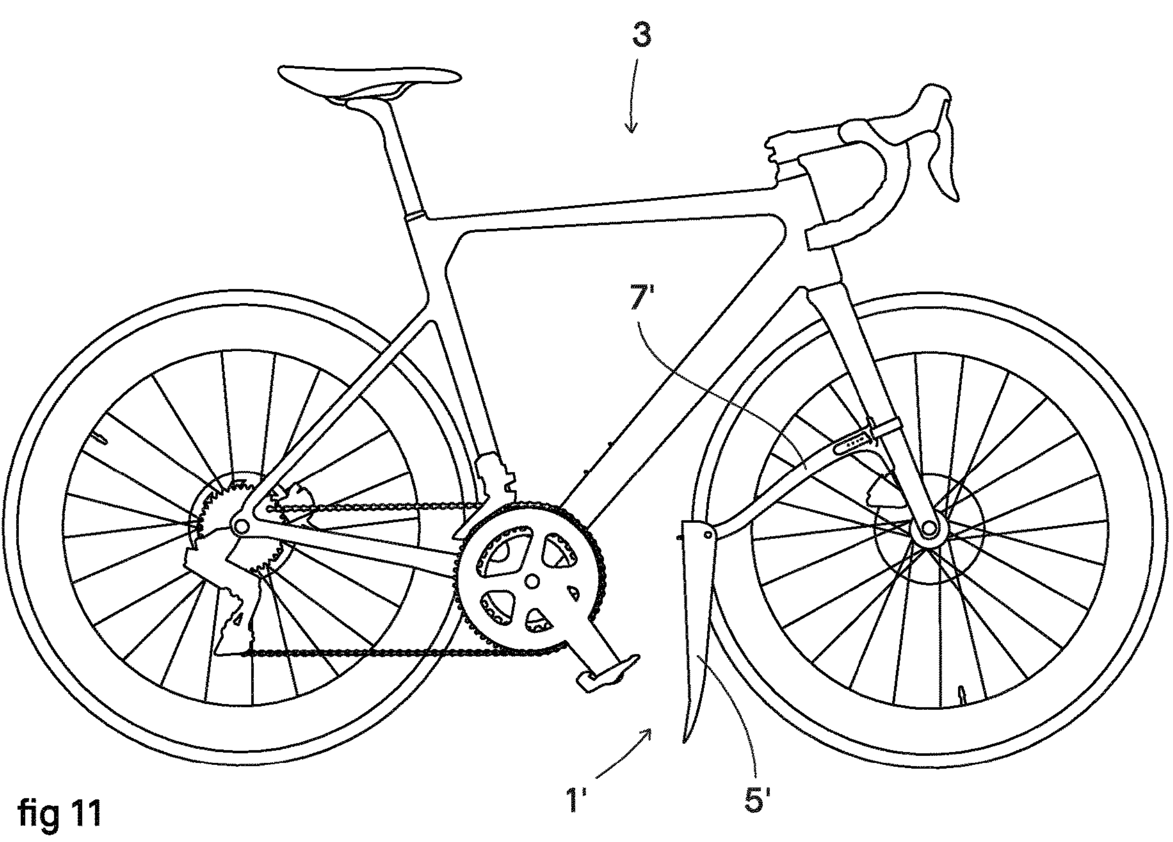
FIG. 11 illustrates a splash guard arrangement according to a second embodiment of the invention attached to a front fork of the bicycle.
Figure 12:
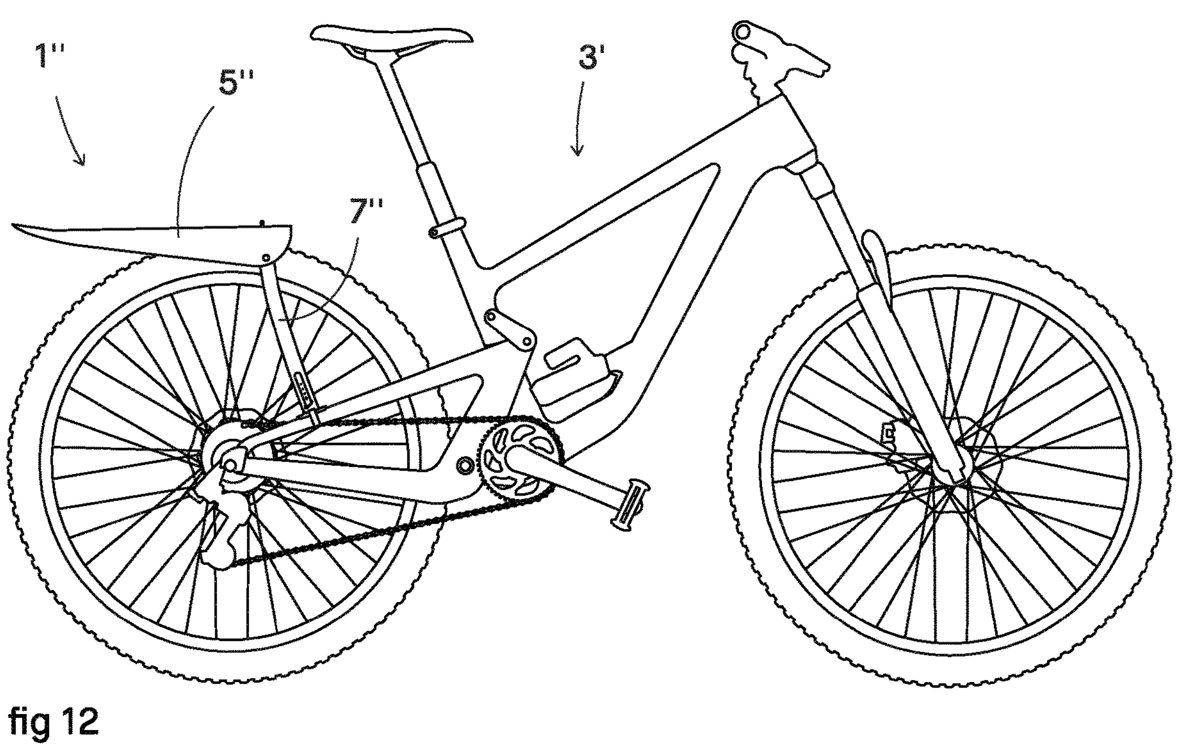
FIG. 12 illustrates a splash guard arrangement according to a third embodiment of the invention attached to a mountain bicycle.

If utilizing a configuration of the second holder end portion 29 like the illustrated one and a corresponding configuration for the first holder end portion 27, it is possible to injection-mould the holder 7 as a single unitary component. The shape of the holder end portions 27, 29 may be chosen such that injection-moulding may be performed without any side-action FIG. 11 illustrates a splash guard arrangement 1' according to a second embodiment of the invention, for which the holder 7' is attached to a front fork of the bicycle 3, such that the first and second frame components are represented by the two fork blades. FIG. 12 illustrates a splash guard arrangement 1" according to a third embodiment of the invention attached to a mountain bicycle 3'. As can be seen when comparing to the splash guard arrangement 1 of the first embodiment, illustrated in FIGS. 1-10, the shapes and sizes of the holders 7', 7" as well as of the splash guards 5', 5" have been adapted to the bicycles 3, 3' and to the positions they are to be attached to.

Figure 13:
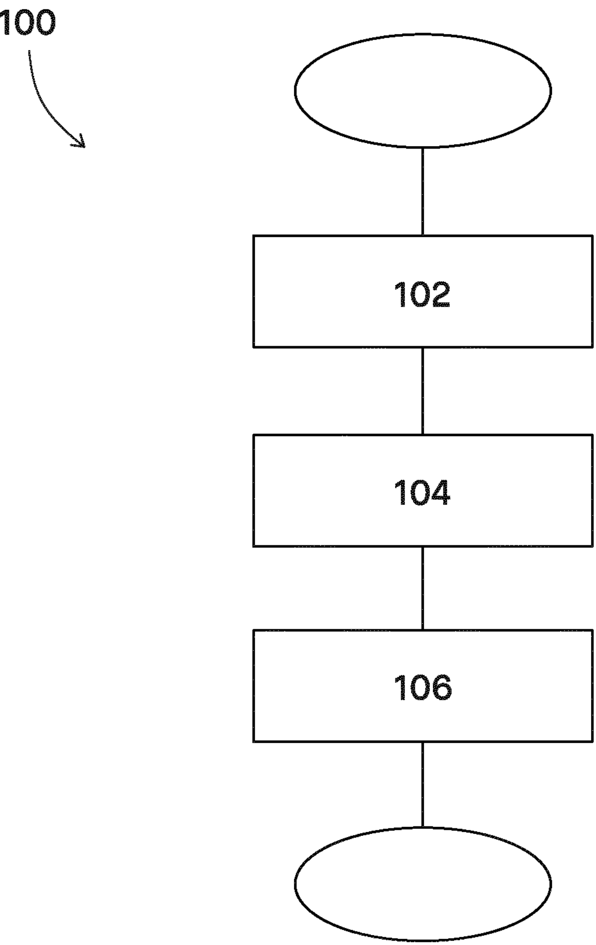
FIG. 13 illustrates a method according to the invention.

The present disclosure further relates to a method 100 of attaching the splash guard arrangement 1 as described herein to a bicycle 3, see FIG. 13. The method comprises, or consists of,

102: Attaching the first fastener 9 around the first frame component 13 of the bicycle 3,

104: Attaching the second fastener 11 around the second frame component 15 of the bicycle 3,

106: Attaching the splash guard 5 on the second portion 23 of the holder 7, thereby holding the splash guard 5 in the second shape.

The steps may be performed in any order. The steps may be performed in sequence or at least partly in parallel. The method can be performed by hand, i.e. the step of attaching the first fastener 9 around the first frame component 13, attaching the second fastener 11 around the second frame component 15 and attaching the splash guard 5 on the second portion 23 of the holder 7 may be performed without any need of a tool. Further, the attachments of the first fastener 9 around the first frame component 13, of the second fastener 11 around a second frame component 15 and of the splash guard 5 to the holder 7 may be released by hand, i.e. without any need of a tool.

The splash guard 5 may be attached on top of the second portion 23 of the holder 7, as seen in FIGS. 1 and 6. As an alternative or a complement, the splash guard 5 may be attached below the second portion 23 of the holder 7, e.g. the splash guard 5 being held by the arc shape of the second portion 23 of the holder 7.

The step 106 of attaching the splash guard 5 on the second portion 23 of the holder 7 may comprise attaching the first and the second side attachment means 71, 73 of the splash guard 5 at the first and the second side attachment means 35, 37 of the holder 7, best seen in FIG. 5. The attachment may be performed without any tools, i.e. making a releasable attachment.

The method may comprise the step of attaching a central attachment means 75 of the splash guard 5 at the central attachment means 41 of the holder 7. This may be performed without any tools. If there are more than one central attachment means 75 of the splash guard 5, as in the embodiment illustrated in FIGS. 1-10, and/or of the holder 7, this step may be used to select a suitable angle from a range of possible angles between the splash guard 5 and the holder 7, such that the splash guard 5 may assume a desirable angle in relation to the wheel 19 of the bicycle 3, see e.g. the positions A, B and C indicated in FIG. 1.

The method may also comprise a step of attaching the first fastener 9 to the first holder end portion 27 and a step of attaching the second fastener 11 to the second holder end portion 29. This step may be performed without any tools.

The present disclosure further relates to a method of attaching the splash guard 5 to the holder 7 in the transport configuration described herein by attaching the splash guard 5 on the second portion 23 of the holder 7, e.g. by attaching the first and the second side attachment means 71, 73 of the splash guard 5 at the first and the second side attachment means 35, 37 of the holder 7. This may be performed without any tools.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A splash guard arrangement for a bicycle, the splash guard arrangement comprising:

a splash guard,
a holder,
a first fastener, and
a second fastener,
the holder comprising a first portion, a second portion, and a third portion,
the second portion being arc-shaped and located between the first portion and the third portion,
the first portion comprising a first holder end portion and the third portion comprising a second holder end portion,
the first holder end portion and the second holder end portion being located at opposite ends of the holder,
the first fastener being adapted for attachment of the holder to a first frame component of the bicycle,
the first fastener being adapted to be attached to the first holder end portion,
the second fastener being adapted for attachment of the holder to a second frame component of the bicycle,
the second fastener being adapted to be attached to the second holder end portion,
the splash guard is transitable from a first shape to a second shape, the splash guard being configured to be held in the second shape by attachment to the second portion of the holder,
wherein the second portion of the holder comprises a first side attachment means and a second side attachment means, wherein the attachment means are spaced apart from a top of the second portion and located at opposite sides of the top, and
the splash guard comprises a first side attachment means and a second side attachment means adapted to cooperate with the first and second side attachment means of the holder, the first and second side attachment means of the holder and of the splash guard being adapted to hold the splash guard in the second shape; and
wherein the splash guard is configured to be held in the second shape by releasable attachment to the second portion of the holder on the top of the second portion of the holder.

2. The splash guard arrangement according to claim 1, wherein the first fastener is adapted for releasable attachment of the holder to a first frame component of the bicycle and the second fastener is adapted for releasable attachment of the holder to a second frame component of the bicycle.

3. The splash guard arrangement according to claim 1,
wherein the first and second side attachment means of the holder are of a male type and the first and second side attachment means of the splash guard are of a mating female type, or
the splash guard comprises the male side attachment means and the holder comprises the female side attachment means, or
the attachment means of the holder and the corresponding ones of the splash guard are a hook-and-loop attachment or comprise a snap-in connection, a pin connection, a rivet connection, a screw connection or a clip connection.

4. The splash guard arrangement according to claim 1, wherein the second portion of the holder comprises a central attachment means, the splash guard comprising a corresponding central attachment means.

5. The splash guard arrangement according to claim 1, wherein the splash guard comprises at least one of:

at least two central attachment means spaced apart in a longitudinal direction of the splash guard and at least two side attachment means spaced apart in the longitudinal direction of the splash guard.

6. The splash guard arrangement according to claim 1, wherein the splash guard comprises a rear fold line close to a rear end portion of the splash guard.

7. The splash guard arrangement according to claim 1, wherein the splash guard comprises a longitudinal fold line extending in the longitudinal direction of the splash guard along at least a portion of a length of the splash guard.

8. The splash guard arrangement according to claim 1, wherein the splash guard is configured to assume a flat shape.

9. The splash guard arrangement according to claim 1, wherein at least one of:

the first fastener comprises a first strip being attachable to the first holder end portion, and the second fastener comprises a second strip being attachable to the second holder end portion.

10. The splash guard arrangement according to claim 9, wherein at least one of the first strip or second strip comprising a respective series of openings adapted to cooperate with a respective protrusion comprised in the first and second holder end portions to select an active portion of the respective first or second strip.

11. The splash guard arrangement according to claim 9, wherein at least one of:

the first holder end portion comprises an opening or a slot, the first strip being adapted to be inserted through the opening or the slot, and the second holder end portion comprises an opening or a slot, the second strip being adapted to be inserted through the opening or the slot.

12. The splash guard arrangement according to claim 1, wherein at least one of:

the first fastener comprises a first head portion adapted to cover an end of the first holder end portion, and the second fastener comprises a second head portion adapted to cover an end of the second holder end portion.

13. The splash guard arrangement according to claim 1, wherein the first and the third portions of the holder comprise a respective curved section.

14. The splash guard arrangement according to claim 1, wherein the splash guard is attachable to the holder in a transport configuration of the splash guard arrangement.

15. The splash guard arrangement according to claim 1, wherein the holder forms a single unitary component.

16. A method of attaching the splash guard arrangement according to claim 1 to a bicycle, the method comprising, attaching the first fastener around a first frame component of the bicycle, attaching the second fastener around a second frame component of the bicycle, attaching the splash guard on top of the second portion of the holder to hold the splash guard in the second shape; and wherein the step of attaching the splash guard on the second portion of the holder comprises attaching the first and the second side attachment means of the splash guard at the first and the second side attachment means of the holder.

17. The splash guard arrangement according to claim 9, wherein at least one of the first strip and the second strip are elastic.

* * * * *